United States Patent [19]

Granger et al.

[11] 4,294,339

[45] Oct. 13, 1981

[54] CLUTCH ASSEMBLY

[75] Inventors: Bruce A. Granger, Prior Lake; David S. Klis, Minneapolis, both of Minn.

[73] Assignee: The Toro Company, Minneapolis, Minn.

[21] Appl. No.: 106,234

[22] Filed: Dec. 21, 1979

[51] Int. Cl.³ .................... F16D 67/02; F16D 13/08; F16D 13/12
[52] U.S. Cl. ........................... 192/12 BA; 192/81 C; 267/158
[58] Field of Search .................. 192/12 BA, 26, 41 S, 192/56 C, 81 C, 37; 267/158, 163

[56] References Cited

U.S. PATENT DOCUMENTS

| 855,915 | 6/1907 | Welton | 192/81 C |
| 2,487,280 | 11/1949 | Starkey | 192/56 C |
| 3,207,546 | 9/1965 | Ernest | 267/158 X |
| 3,302,762 | 2/1967 | Conlon | 192/41 S X |
| 3,915,268 | 10/1975 | MacDonald | 192/12 BA |

FOREIGN PATENT DOCUMENTS 2549817  6/1975  Fed. Rep. of Germany ...... 267/158

Primary Examiner—Allan D. Herrmann
Attorney, Agent, or Firm—James W. Miller

[57] ABSTRACT

An improved clutch assembly is described which includes a safety spring member which is adapted to engage the free end of a broken clutch spring so that the clutch will continue to operate in normal fashion.

3 Claims, 5 Drawing Figures and

CLUTCH ASSEMBLY

BACKGROUND OF THE INVENTION

This invention relates to clutch mechanisms. More particularly, it relates to clutch mechanisms of the type in which a rotatable member is engageable with a driven hub by means of a coiled clutch spring.

Clutch mechanisms of this type are known and have commercial application in devices such as riding lawn mowers to engage and disengage power to the cutting blade. Although such clutch mechanisms work very well, it has been found in a small percentage of such devices that after several thousand cycles of operation the tang on one end of the coiled clutch spring may break off. As a result, the clutch mechanism will remain permanently engaged so that power is continuously supplied to the cutting blade when the engine is running. This naturally is undesirable since it may lead to dangerous situations in the operation of the mower.

SUMMARY OF THE INVENTION

The present invention provides an improved clutch assembly in which safety means is included which is adapted to engage the free end of the coiled clutch spring in the event that the clutch spring breaks adjacent to its end.

Thus, in the present invention there is provided a clutch assembly of the type having a driven hub which is received by a rotatable member coaxially disposed with respect thereto, wherein said rotatable member is engageable with said driven hub by means of a coiled clutch spring which surrounds said hub and which is fixed at its first end to said rotatable member and engaged at its second end by means of a tang to a brake platter which is moveable between a first position in which said spring engages said driven hub and thereby enables said driven hub to rotatably drive said rotatable member and a second position in which said spring is expanded whereby said rotatable member is disengaged from said driven hub, the improvement comprising a curved safety spring member having a first end which is engageable with said brake platter by means of a tang and an opposite end which is adapted to engage a free end of said coiled spring in the event said coiled spring breaks adjacent to its said second end.

The improved clutch assembly is much safer because the safety spring member is adapted to engage the free end of a broken clutch spring so that the clutch may be operated in the normal fashion to engage and disengage the rotatable member with respect to the driven hub.

DETAILED DESCRIPTION OF THE INVENTION

The present invention is described in more detail hereinafter with reference to the accompanying drawings wherein like reference characters refer to the same parts throughout the several views and in which.

Figure 1:
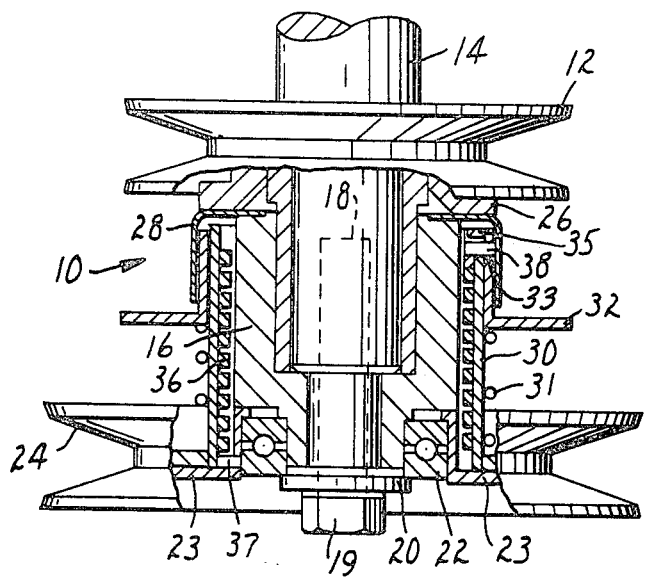
FIG. 1 is a partially cut-away side view of the improved clutch assembly of the invention.
Figure 2:
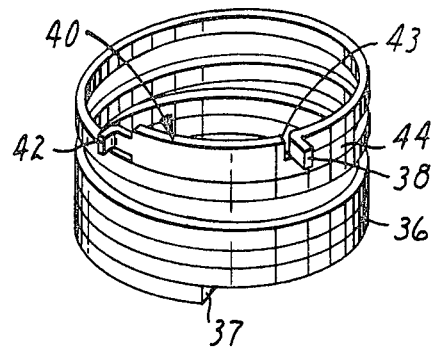
FIG. 2 is a perspective view of a coiled clutch spring assembly including the safety spring member.

In FIG. 1 there is shown a side view of the improved clutch assembly 10, partially cut away to show the internal portions of the assembly. Pulley 12 is affixed to drive shaft 14 which has its lower end extending into hub 16. Bolt 18 is threaded into the lower end of shaft 14 to thereby securely affix hub 16 to shaft 14. Washer or spacer 20 adjacent the head 19 of bolt 18 fits against bearing 22 around which the bearing support 23 and pulley 24 are journalled. Spacer 26 between pulley 12 and dust cap 28 maintains dust cap 28 in its proper location during operation so that dirt and debris do not enter the upper portion of the clutch assembly.

Power is supplied to hub 16 by means of drive shaft 14 operatively connected to a power source (e.g. a gasoline engine). Shaft 14 thereby drives pulley 12 and hub 16 continuously. Pulley 24 is affixed (e.g. spot welded) to bearing support 23. Upstanding cylindrically-shaped member 30 is affixed to pulley 24 by glueing and staking, and together pulley 24, bearing support 23 and member 30 form a rotatable member which is operatively connected by means of a belt (not shown) to a cutting blade, for example.

A clutch means defined by a coiled clutch spring 36 is fastened at its lower end 37 to bearing support 23 and at its upper end to brake platter 32 by means of tang 38. Clutch spring 36 is adapted to engage the hub 16 when spring 36 is in its normal collapsed state to thereby permit driven hub 16 to drive member 30, bearing support 23 and pulley 24. When clutch spring 36 is in a radially expanded state, as by unwinding, it releases hub 16. This occurs when brake platter 32 is forced downwardly by means of a cooperating platter (not shown). Spring 31 assists in urging brake platter 32 back to its normal engaged position.

Figure 4:
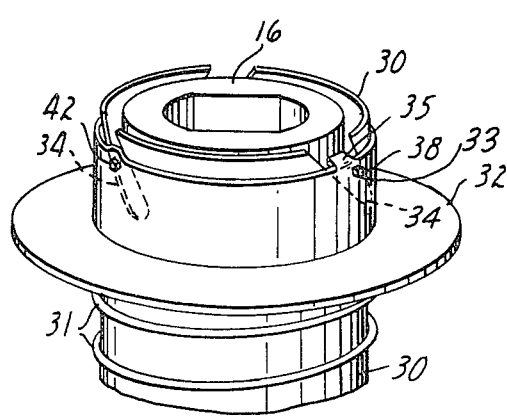
FIG. 4 shows the manner in which the brake platter in the assembly of FIG. 1 engages one end of the coiled clutch spring and the safety spring member.

FIG. 4 is a side view of a portion of the assembly illustrating the manner in which brake platter 32 causes the clutch spring 36 to expand. Fingers 35 project into angled slots 34 in member 30. Tang 38 of the clutch spring is captured in one aperture 33 in brake platter 32 and tang 42 of the safety spring member 40 is captured in another aperture 33 in brake platter 32. Because slots 34 are angled, downward movement of brake platter 32 will rotate both brake platter 32 and the upper end of clutch spring 36. This rotation unwinds spring 36 which forces clutch spring 36 to expand. When tang 38 reaches the bottom of slot 34, the brake platter 32 is locked up relative to the member 30 and the cooperating platter used to force brake platter 32 down can exert a frictional braking force on the brake platter to slow down and stop pulley 24. This action is more fully described in U.S. Pat. No. 3,915,268.

Figure 5:
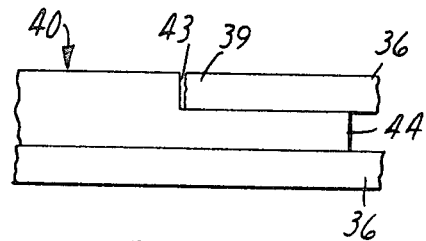
FIG. 5 shows the manner in which the safety spring member of FIG. 3 engages a free end of a broken clutch spring.

If tang 38 should break off, or if the clutch spring breaks adjacent thereto, safety spring member 40 will engage the free end 39 of the clutch spring and thereby enable the clutch assembly to operate normally. This is shown in FIG. 5 where free end 39 of clutch spring 36 rests on end portion 44 of the safety spring member 40. Abutment portion 43 of spring member 40 will push against free end 39 when the brake platter 32 is urged downwardly to thereby cause clutch spring 36 to expand and disengage hub 16.

Figure 3:
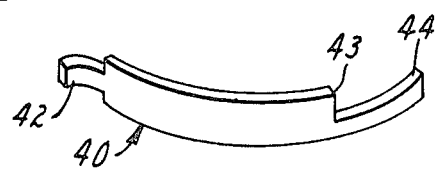
FIG. 3 is a perspective view of a preferred safety spring member.

The preferred safety spring member 40 is shown in FIG. 3. One end comprises tang 42 and the opposite end comprises foot or toe 44 and abutment portion 43. Toe 44 is adapted to fit between adjacent coils of clutch spring 36. Portion 43 is adapted to be urged against the free end of a broken clutch spring. The curvature of spring member 40 approximates that of the clutch spring. It has been found that superior results are obtained when spring member 40 includes toe portion 44 which fits between adjacent coils of clutch spring 36. Without toe portion 44 it has been found that the abutment portion 43 sometimes disengages from free end 39 of a broken clutch spring and the clutch spring 36 slips under spring member 40. Of course, if this should happen then the safety spring member cannot cause the clutch spring to disengage from hub 16. Other variants are permissible without departing from the scope of the present invention.

What is claimed is:

1. An improved clutch assembly of the type having a driven hub, a rotatable member, clutch means for selectively driving the rotatable member from the driven hub, wherein the clutch means comprises a coiled spring secured to the rotatable member and surrounding the hub and having a first configuration in which the spring engages the hub to drive the rotatable member and a second configuration in which the spring disengages the hub to stop driving the rotatable member, and movable means secured by a first connecting means to the spring for placing the spring into its second configuration, wherein the improvement comprises:

safety means for connecting the spring to the movable means for continued operation of the clutch means in the event the first connecting means fails.

2. In a clutch assembly of the type having a driven hub which is received by a rotatable member coaxially disposed with respect thereto, wherein said rotatable member is engageable with said driven hub by means of a coiled clutch spring which surrounds said hub and which is fixed at its first end to said rotatable member and engaged at its second end by means of a tang to a brake platter which is movable between a first position in which said spring engages said driven hub and thereby enables said driven hub to rotatably drive said rotatable member and a second position in which said spring is expanded whereby said rotatable member is disengaged from said driven hub, the improvement comprising a curved safety spring member having a first end which is engageable with said brake platter by means of a tang and an opposite end which is adapted to engage a free end of said coiled spring in the event said coiled spring breaks adjacent to its said second end.

3. The improved clutch assembly of claim 2, wherein said opposite end of said safety spring member comprises (a) a toe portion which is adapted to fit between adjacent coils of said clutch spring, and (b) an abutment portion which is adapted to be urged against said free end of said coiled clutch spring.

* * * * *